United States Patent
Steidl

(10) Patent No.: US 12,467,821 B2
(45) Date of Patent: Nov. 11, 2025

(54) METHOD FOR DETERMINING A LIFE CONDITION OF A VIBRATION DAMPER OR ABSORBER, AND ARRANGEMENT FOR CARRYING OUT SUCH A METHOD

(71) Applicant: Hasse & Wrede GmbH, Berlin (DE)

(72) Inventor: Michael Steidl, Berlin (DE)

(*) Notice: Subject to any disclaimer, the term of this patent is extended or adjusted under 35 U.S.C. 154(b) by 454 days.

(21) Appl. No.: 18/010,694

(22) PCT Filed: Jun. 14, 2021

(86) PCT No.: PCT/EP2021/065992
§ 371 (c)(1),
(2) Date: Dec. 15, 2022

(87) PCT Pub. No.: WO2021/254970
PCT Pub. Date: Dec. 23, 2021

(65) Prior Publication Data
US 2023/0228315 A1    Jul. 20, 2023

(30) Foreign Application Priority Data

Jun. 17, 2020 (EP) ..................... 20180571

(51) Int. Cl.
*G01M 7/02* (2006.01)
*F16F 15/16* (2006.01)
(Continued)

(52) U.S. Cl.
CPC .......... *G01M 7/025* (2013.01); *G01M 99/007* (2013.01); *F16F 15/164* (2013.01); *F16F 15/173* (2013.01)

(58) Field of Classification Search
CPC .... F16F 15/173; F16F 15/164; F16F 2230/24; G01M 7/025; G01M 99/007
(Continued)

(56) References Cited

U.S. PATENT DOCUMENTS

2004/0219079 A1* 11/2004 Hagen .............. F23C 6/02
422/607
2019/0009892 A1* 1/2019 Fazeli .............. B64C 25/60
2020/0018377 A1 1/2020 Hohl et al.

FOREIGN PATENT DOCUMENTS

CN    106844898 A  *  6/2017
CN    116720305 A  *  9/2023
(Continued)

OTHER PUBLICATIONS

Translation_ DE_102006021937 (Year: 2007).*
(Continued)

*Primary Examiner* — Peter J Macchiarolo
*Assistant Examiner* — Monica S Young
(74) *Attorney, Agent, or Firm* — Crowell & Moring LLP

(57) ABSTRACT

A method determines a service life condition of a torsional vibration damper or absorber having a primary mass and a secondary mass, and a working chamber arranged between the primary mass and the secondary mass that is filled with a viscous damping medium. The vibration damper is arranged on a crankshaft of an engine in order to dampen or eliminate torsional vibrations of this crankshaft. The method includes: operating the engine; determining at least one operating parameter of the engine; simulating a temperature distribution of the viscous damping medium in the working chamber; and determining a lifetime condition of the vibration damper based on the operating parameter of the engine and the result of simulating the temperature distribution of the viscous damping medium.

15 Claims, 4 Drawing Sheets

(51) Int. Cl.
*F16F 15/173* (2006.01)
*G01M 99/00* (2011.01)

(58) Field of Classification Search
USPC .......................................................... 73/11.05
See application file for complete search history.

(56) References Cited

FOREIGN PATENT DOCUMENTS

| DE | 102006021937 A1 | * | 11/2007 | ............ F16F 9/3264 |
| EP | 3242055 A1 | * | 11/2017 | ............ F16F 15/173 |
| EP | 3 242 055 B1 | | 6/2019 | |
| JP | 2000-314452 A | | 11/2000 | |
| WO | WO-2018144065 A1 | * | 8/2018 | ............. F01D 25/12 |
| WO | WO 2019/030174 A1 | | 2/2019 | |

OTHER PUBLICATIONS

Translation CN 106844898 (Year: 2017).*
International Search Report (PCT/ISA/210) issued in PCT Application No. PCT/EP2021/065992 dated Sep. 23, 2021 (three (3) pages).
Written Opinion (PCT/ISA/237) issued in PCT Application No. PCT/EP2021/065992 dated Sep. 23, 2021 (seven (7) pages).
Extended European Search Report issued in European Application No. 20180571.0 dated Dec. 15, 2020 (nine (9) pages).
Chinese-language Office Action issued in Chinese Application No. 202180043140.5 dated May 14, 2025 with English translation (9 pages).

* cited by examiner

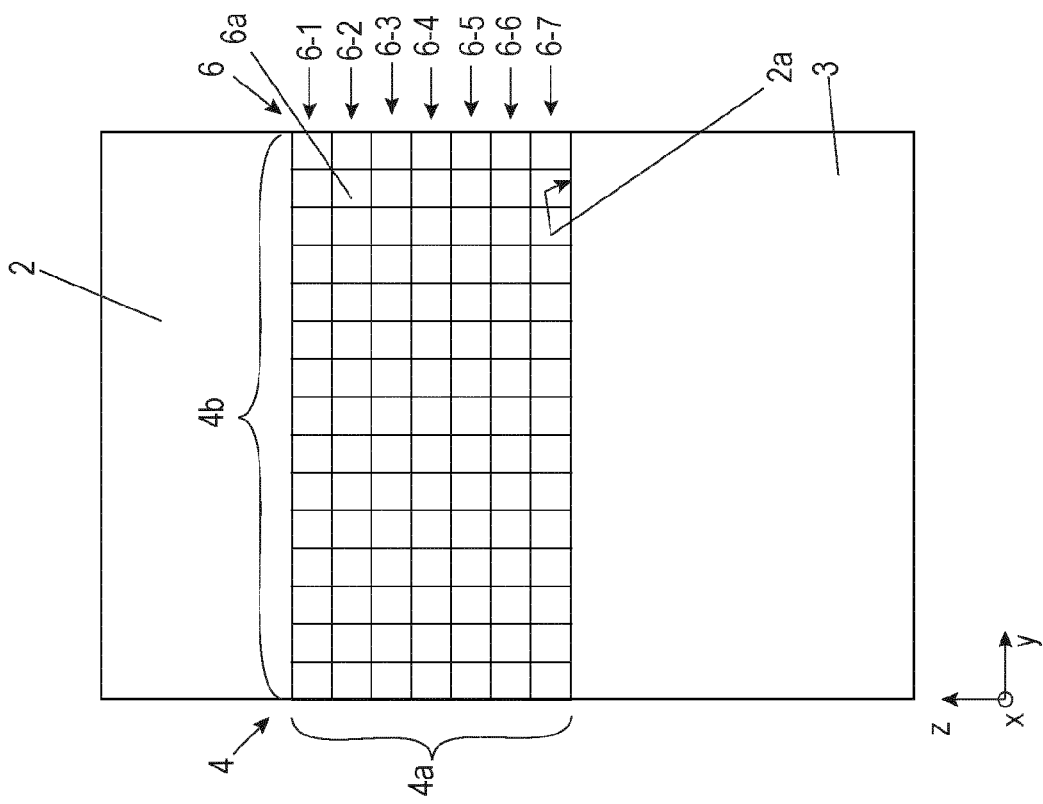
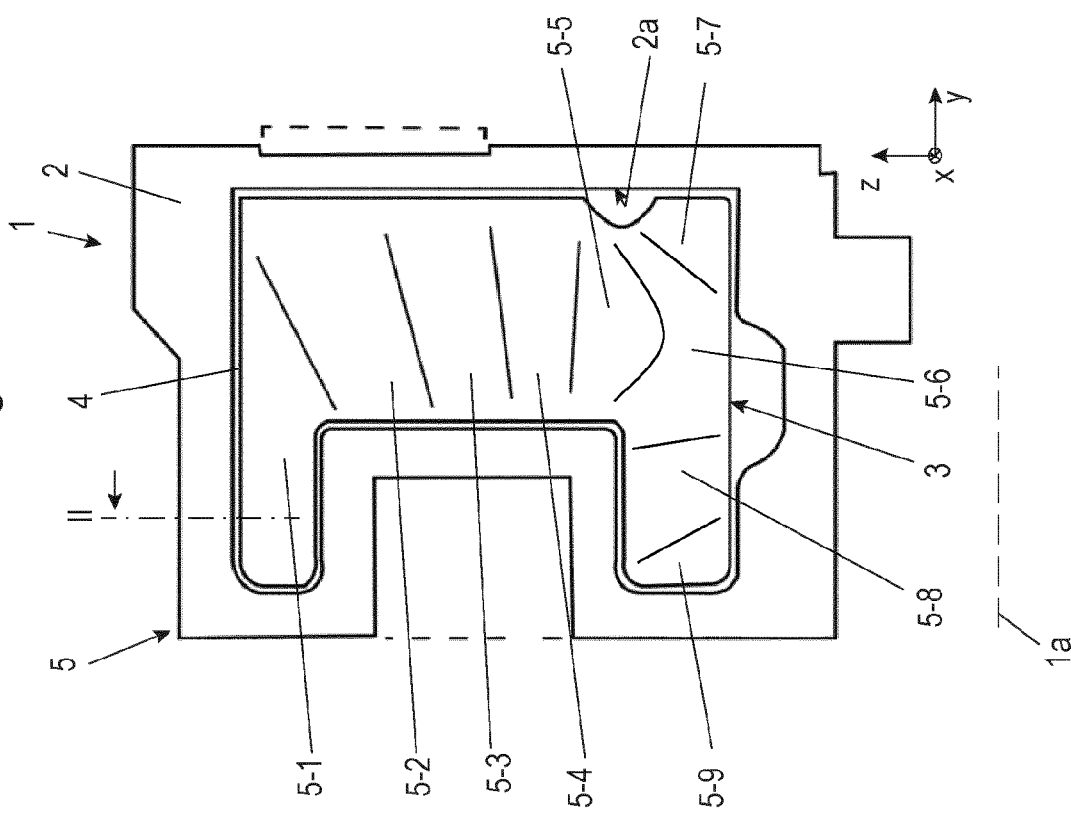

METHOD FOR DETERMINING A LIFE CONDITION OF A VIBRATION DAMPER OR ABSORBER, AND ARRANGEMENT FOR CARRYING OUT SUCH A METHOD

BACKGROUND AND SUMMARY

The invention relates to a method for determining a lifetime condition of a vibration damper, in particular a torsional vibration damper or absorber. The invention also relates to an arrangement for carrying out such a method.

Vibration dampers are available for different damping of mechanical vibrations of vibrating devices. For the damping of torsional vibrations, for example, torsional vibration dampers are used with a damping device arranged between a crankshaft of an internal combustion engine, such as a piston engine, and a drive train. Torsional vibration dampers can also be mounted on a free end of the crankshaft.

A torsional vibration damper can be designed as a so-called visco-damper with, for example, a housing as a primary mass, an annular working chamber and a flywheel ring as a secondary mass. The flywheel ring is arranged in the annular working chamber so that it can rotate relative to the housing and is surrounded by a viscous damping medium.

The viscous damping medium is, for example, a silicone oil. The damping medium ages with time. Important ageing accelerators are the stress caused by high temperatures, air admission, catalytic processes and the type and quantity of any impurities. The service life of the viscous damping medium is decisively dependent on the temperature of the medium.

Document EP 3 242 055 B1 describes a wear indicator of a vibration damper. A temperature of the vibration damper is measured. The temperature of the damping medium is a key factor.

However, it is considered disadvantageous that the temperature of the damping medium cannot be measured directly from outside. The reason for this is that the temperature of the damping medium is strongly dependent on the radius and also has a very steep gradient (e.g. 35° C. within 0.6 mm) over a damping gap in which the damping medium is arranged. The attempt to determine the temperature of the damping medium very precisely by measurement is extremely difficult, since measurements have to be taken at various points of the damping medium.

Therefore, it is the object of the invention to provide an improved method for determining a lifetime condition of a vibration damper, in particular a torsional vibration damper or absorber.

The object is solved by a method and an arrangement according to the independent claims.

An inventive idea is based on the fact that a temperature distribution of the damping medium is simulated. This simulation is carried out as a function of the operating state of the machine.

A method according to the invention for determining a service life condition of a vibration damper, in particular a torsional vibration damper or absorber, having a primary mass and a secondary mass, and having a working chamber which is arranged between the primary mass and the secondary mass and is filled with a viscous damping medium, wherein the vibration damper is arranged on a crankshaft of an engine, in particular of an internal combustion engine, in order to dampen or eliminate torsional vibrations of this crankshaft, the crankshaft forming part of the engine, is designed with the following steps when operating this engine. S1) operating the engine; S2) determining at least one operating parameter of the engine; S3) simulating a temperature distribution of the viscous damping medium in the working chamber; and S4) determining a lifetime condition of the vibration damper based on the operating parameter of the engine and the result of simulating the temperature distribution of the viscous damping medium.

A particular advantage is that the procedure can be carried out without measuring the temperature of the damping medium.

An arrangement according to the invention for determining a service life condition of a vibration damper, in particular a torsional vibration damper or absorber, comprises a vibration damper and a machine with a machine control. The arrangement also has an evaluation device with a computer unit with at least one simulation program for temperature distributions and at least one memory device for storing data.

It is particularly advantageous that no complex measurement technology with associated installation is required. The arrangement is designed to perform the inventive method described above. Only variables that are known anyway, e.g. operating data of the machine, are evaluated. These known variables can be obtained from the machine control system in a simple manner.

Advantageous further aspects of the invention are subject of the dependent claims.

In an aspect of the method, steps S1) and S2) are repeated at predetermined intervals during operation of the machine, and the fatigue life condition of the vibration damper is determined based on a plurality or all of the operating parameter determinations and temperature distribution simulations performed.

Here it is advantageous that the operating parameter is the operating time of the machine, since these values are available and can be obtained from a machine control system in a simple way, e.g. as electrical data values.

Another aspect of the invention provides that when simulating the temperature distribution of the viscous damping medium, a three-dimensional temperature distribution is determined as the temperature field of the viscous damping medium in the working chamber. By precise simulation of the three-dimensional temperature field of the damping medium, significantly more accurate information about the temperature distribution in the vibration damper can be obtained depending on the operating state of the machine and thus also advantageously over the service life of the vibration damper.

It is further provided that the primary mass has a ring-like housing with a ring-like working chamber and that the secondary mass is a flywheel ring arranged in the ring-like housing, a gap filled with the viscous damping medium, in particular a silicone oil, being formed between the flywheel ring and the housing in the working chamber, a three-dimensional temperature distribution of the viscous damping medium in the gap in the working chamber being determined during the simulation of the temperature distribution of the viscous damping medium. It is advantageous that no sensor is required for this.

It is also advantageous that the temperature distribution can be simulated as a temperature field of the viscous damping medium for different operating states of the machine, since this allows even more precise statements to be made about the service life of the vibration damper.

In another aspect, the simulation values of the temperature field of the viscous damping medium can be used to determine an associated degradation rate of the damping medium and compared with previously stored values of degradation rates of the damping medium as reference values. In this way, lifetimes can be determined quickly and accurately.

Previously stored values of degradation rates of the damper medium can be stored as reference values for all operating conditions, preferably in a file designed as a "look-up table". This provides fast access to reference values, which can of course be specified more precisely at certain intervals by subsequent additions.

It is therefore advantageous to determine an instantaneous degradation rate of the damper medium by comparing it with previously stored reference values. This allows an up-to-date statement about the condition of the vibration damper.

It is advantageous that damage to the vibration damper is determined by integrating the determined degradation rates of the damper medium over time and thus a prediction of the service life can be made.

In this way, an output, an alarm, a warning or the like can be advantageously issued when a previously defined limit value is exceeded.

In a further version, an at least one-time calibration with a measurement of another parameter, e.g. an outside temperature of the vibration damper at a previously defined point, can be used for additional calibration of the simulation.

An ambient temperature can also be used selectively or during operation of the machine and the vibration damper in order to be able to make a more precise statement about the service life of the vibration damper.

In addition, the following advantages result compared to the state of the art.

No complex measuring technology is required, instead, only variables that are known anyway are evaluated. This allows much more accurate predictions of the three-dimensional temperature field and thus the service life of the vibration damper.

A much more accurate prediction of the three-dimensional temperature field and thus of the lifetime is possible.

Short-term temperature changes in the damping medium can be taken into account, which, for example, are not noticed at all when the damper outside temperature is measured only.

Examples of aspects of the invention are described below using the attached drawings.

BRIEF DESCRIPTION OF THE DRAWINGS

FIG. 2 is a schematic partial sectional view of a vibration damper;

FIG. 3 is a schematic sectional view of a gap of the vibration damper according to FIG. 2;

DETAILED DESCRIPTION OF THE DRAWINGS

Figure 1:
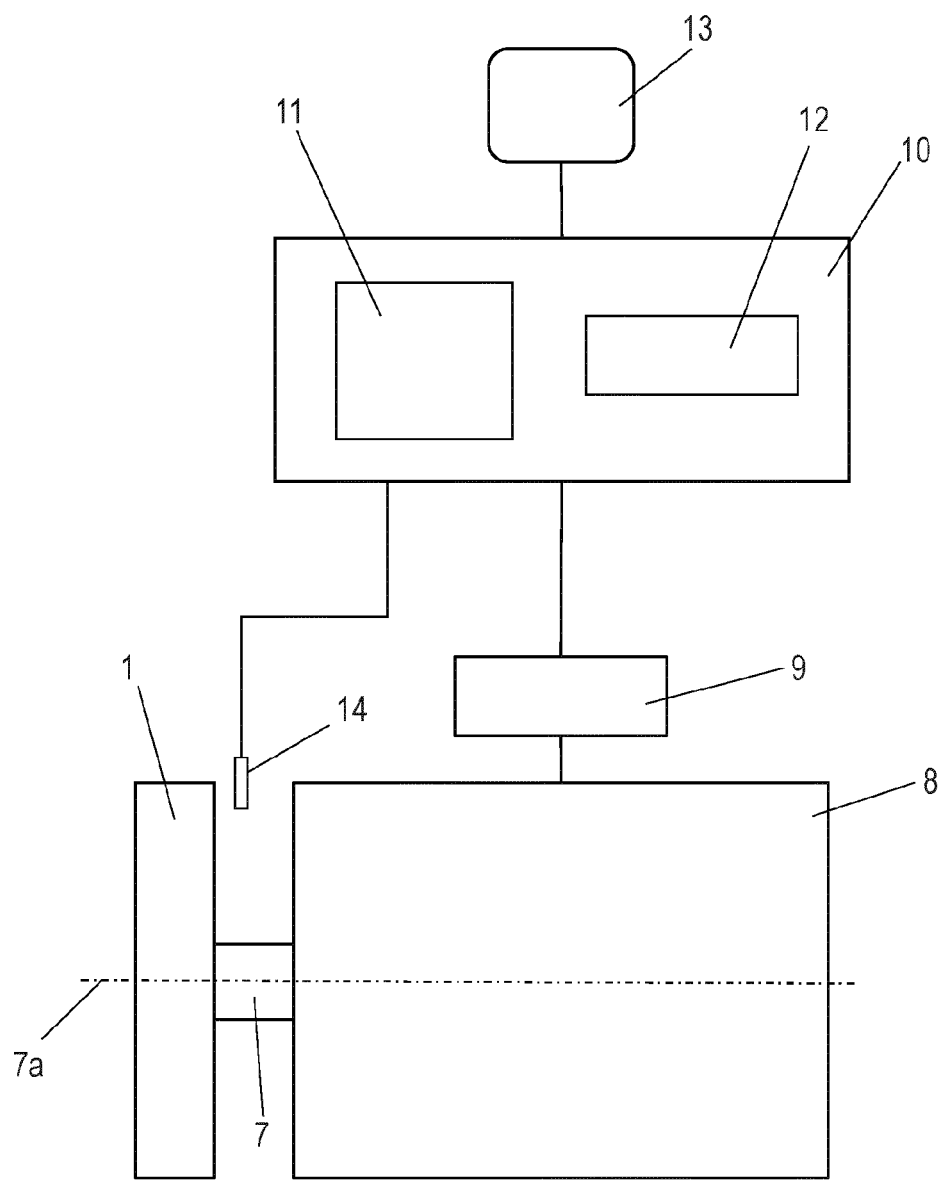
FIG. 1 is a schematic block diagram of an arrangement according to an embodiment of the invention.

FIG. 1 shows a schematic block diagram of an arrangement for determining a service life condition of a vibration damper 1, in particular a torsional vibration damper or absorber.

The arrangement comprises a vibration damper 1, a machine 8 with a machine control 9 and an evaluation device 10.

Here the vibration damper 1 is designed as a torsional vibration damper and is mounted on a crankshaft 7 of the machine 8 in order to dampen or eliminate torsional vibrations of the crankshaft 7. The crankshaft has a crankshaft axis 7a.

The machine 8 is a piston engine, for example. The machine control 9 is connected to the evaluation unit 10 with one or more transmission lines.

The evaluation device 10 comprises a computer unit 11 with at least one simulation program for temperature distributions and at least one storage device 12 for storing data.

In addition, the evaluation device 10 determines a current and a remaining service life of the vibration damper 1 and outputs information and alarms via an output 13. An alarm is triggered, for example, if a limit value is determined with respect to damage or an end of life of vibration damper 1.

Output 13 is connected to or integrated in the evaluation unit 10. The output 13 can be a display, a printer, an interface, an optical, acoustic and/or haptic output.

In addition, the arrangement has at least one sensor 14 with which an ambient temperature of the vibration damper 1 can be recorded.

The arrangement is designed to carry out a method, described in detail below, for determining a service life condition of a vibration damper or absorber, i.e. vibration damper 1.

Using the method it is possible to determine a service life of visco-dampers, e.g. of vibration damper 1. For this purpose, a temperature distribution of a damping medium of the vibration damper 1 is precisely simulated by means of the computer unit 11 of the evaluation unit 10. This simulation is carried out depending on the operating state of the machine 8, which is transmitted to the evaluation unit 10, e.g. in the form of data values from the machine control 9.

FIG. 2 shows a schematic partial sectional view of the vibration damper 1 in a design as a torsional vibration damper with a rotational axis 1a.

Coordinates x, y, z are used for orientation. Coordinate x runs in the direction of the axis of rotation 1a, coordinate y at right angles to it, with coordinate z in the radial direction in FIG. 2.

The design and function of a torsional vibration damper are assumed to be known and will not be explained in detail here. In this respect, reference is made to document EP 3 242 055 B1, for example.

The vibration damper 1 here comprises a ring-shaped housing 2 as a primary mass and a flywheel ring 3 as a secondary mass arranged in the housing 2 in a working chamber 2a. The working chamber 2a is here designed as an annular chamber.

The housing 2 and the flywheel ring 3 are arranged coaxially to the axis of rotation 1a and can rotate around it. The flywheel ring 3 is mounted in housing 2 so that it can rotate relative to housing 2. The bearing is not shown.

A gap 4 is formed between the flywheel 3 and the housing 2. The gap 4 is filled with a damping medium, e.g. a silicone oil. The damping depends on the viscosity of the damping medium.

Figure 4:
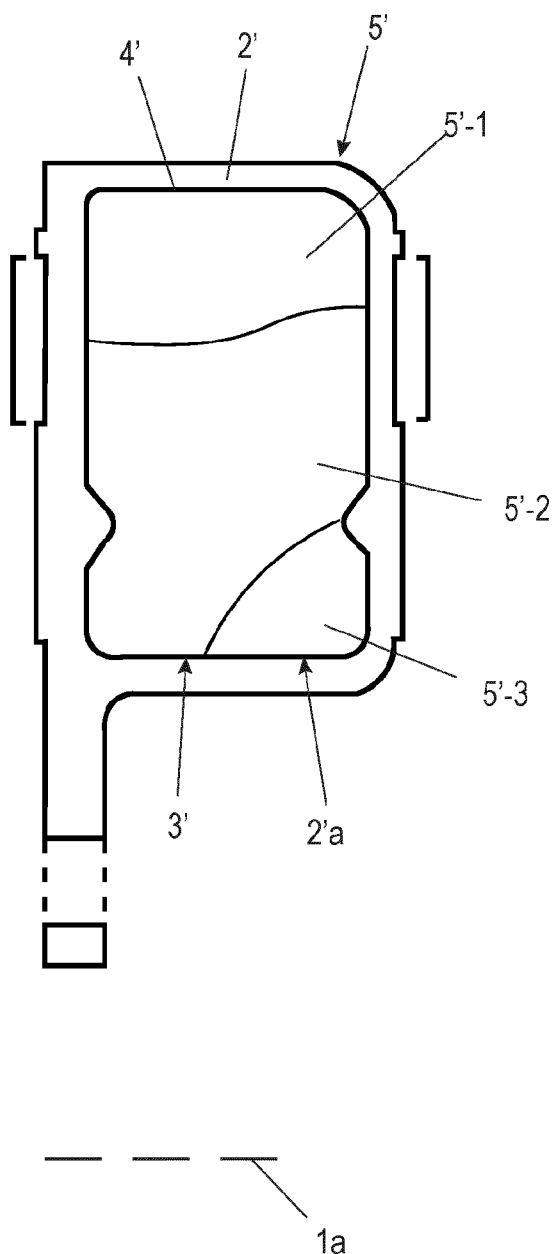
FIG. 4 is a schematic sectional view of an internal vibration damper.

The vibration damper 1 is mounted as a torsional vibration damper, for example, on/on a crankshaft 7 of an internal combustion engine, e.g. a piston engine (see FIG. 4). When the vibration damper 1 is in operation, the damping medium in the gap 4 heats up and the heat generated is distributed to the housing 2 and the flywheel ring 3.

In FIG. 2, such a temperature distribution is shown as a temperature field 5 exemplary for the flywheel 3. For this purpose, the cross-section of the flywheel 3 is divided into different temperature ranges 5-1 to 5-9 running from the radially outer area of the flywheel 3 in the direction of the axis of rotation 1a.

The temperature field 5 with its temperature ranges 5-1 to 5-9 has been simulated for this example using a suitable computer program. The temperatures in the following table have been calculated and assigned to the temperature ranges 5-1 to 5-9 shown in FIG. 2.

TABLE 1

| Temperature field 5 | |
|---|---|
| Temperature Range | Temperature [° K.] |
| 5-1 | 402 |
| 5-2 | 400 |
| 5-3 | 397 |
| 5-4 | 395 |
| 5-5 | 393 |
| 5-6 | 392 |
| 5-7 | 390 |
| 5-8 | 390 |
| 5-9 | 389 |

It can be seen that the largest part of the outer radial section of the flywheel 3 with the temperature range 5-1 has the highest temperature.

FIG. 3 shows a schematic sectional view of the gap 4 of the vibration damper 1 along line II-II according to FIG. 2.

The gap 4 is shown rectangular with a radial length 4a in z-direction and a transverse length in y-direction. Furthermore, gap 4 is shown with a grid representing a simulated temperature field 6.

The temperature field 6 is divided into finite elements 6a in the simulation program. This is shown here only two-dimensionally in a y-z plane. The elements 6a can also be three-dimensional finite volume elements.

The elements 6a of the temperature field 6 are arranged in layered temperature ranges 6-1 to 6-7 in radial z-direction starting from the outer radius of the gap 4 towards the axis of rotation 1a.

A division of the gap 4 into a number of layered temperature ranges 6-1 to 6-7 as well as into a certain number of elements 6a can be adapted to different boundary conditions. The numbers shown here are only exemplary.

The following table shows the temperature ranges 6-1 to 6-7 shown in FIG. 2 with the simulated calculated temperatures assigned in this example.

TABLE 2

| Temperature field 6 | |
|---|---|
| Temperature Range | Temperature [° K.] |
| 6-1 | 390 . . . 392 |
| 6-2 | 392 |
| 6-3 | 394 . . . 396 |
| 6-4 | 396 |
| 6-5 | 398 |
| 6-6 | 400 |
| 6-7 | 402 |

The calculation and analysis of the finite elements 6a can be performed in the radial length 4a, in the transverse length 4b, as well as in the circumferential length of the gap 4.

The layers of the temperature field 6 starting from a boundary layer with the temperature range 6-7, which are directly in contact with the outer radius of the flywheel 3, as well as the layers above it, for example up to the temperature range 6-4, have the highest temperatures. These layers of the damping medium are exposed to the highest shear forces and thus to high internal friction.

The temperature of the damping medium is strongly dependent on the radius of the gap 4 and has a very steep gradient over the gap, for example 35° C. within a distance of 0.6 mm.

A precise simulation of the three-dimensional damper medium temperature field 6 provides much more precise information about the temperature distribution in the vibration damper 1 as a function of the operating state of the machine and thus also about the service life of the vibration damper 1.

FIG. 4 shows a schematic sectional view of an internal vibration damper 1' with a temperature simulation.

Only three temperature ranges 5'-1 to 5'-3 of the corresponding temperature field 5' are entered here. A temperature of the respective associated temperature range 5'-1 to 5'-3 is given in the following table.

TABLE 3

| Temperature field 5'. | |
|---|---|
| Temperature Range | Temperature [° C.] |
| 5'-1 | 144 |
| 5'-2 | 139 |
| 5'-3 | 133 |

Figure 5:
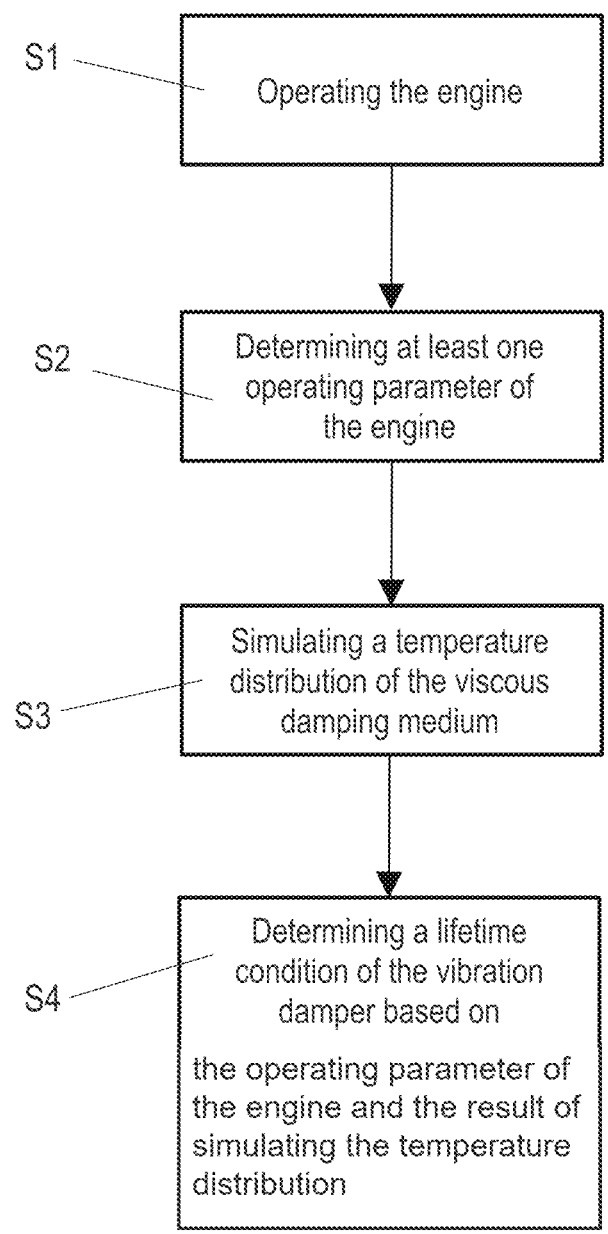
FIG. 5 is a schematic flow chart of an exemplary process according to the invention.

FIG. 5 shows a schematic flowchart of the method for determining a service life condition of a vibration damper or absorber, e.g. vibration damper 1.

In a first process step S1, machine 8, e.g. a piston engine, an internal combustion engine or the like, is operated.

At least one operating parameter of machine 8 is determined in a second process step S2. Transmitting certain data values of the machine control 9 to the evaluation device 10 can do this.

Such an operating parameter of machine 8 can, for example, be the operating time of machine 8.

In a third process step S3, a temperature distribution, i.e. a temperature field 6, of the viscous damper medium in the working chamber 2a, 2'a of the vibration damper 1 is simulated. This simulation is carried out by means of one or more simulation programs in the computer unit 11 of the evaluation unit 10.

The simulation preferably determines a three-dimensional temperature distribution of the viscous damper medium in the working chamber 2a, 2'a and in the gap 4 in the working chamber.

Finally, in a fourth process step S4, a determination of a lifetime condition of the vibration damper 1 is carried out based on the operating parameter of the machine 8 and the result of the simulation.

The process steps S1 and S2 are repeated at predetermined intervals during operation. The service life condition is determined based on a majority or all of the operating parameter determinations and temperature distribution simulations carried out.

Furthermore, a one-time calibration with a measurement e.g. of the outside temperature of the vibration damper at one point, e.g. with sensor 14, can be used for additional calibration of the simulation model. Also, an ambient temperature can be used punctual or also during operation of the machine 8 and the vibration damper 1.

The three-dimensional temperature field 6 of the damper medium can also be determined for different operating conditions.

Using the simulation values, an associated degradation rate of the damper medium is determined and compared with previously stored reference values. If a limit value is exceeded, an output, an alarm, a warning or the like can occur.

The previously stored reference values can be stored in a file ('look-up-table') in memory 12 of the evaluation unit 10 as a deposit of the degradation rates for all operating conditions in tabular form.

In this way it is possible to determine and/or display an instantaneous degradation rate.

Damage to the vibration damper 1 can be determined by integrating the degradation rate over time and also stored, e.g. for inspection.

The invention is not restricted by the above mentioned design example, but can be modified within the scope of the claims.

It is contemplated that the evaluation device 10 can be fully or partially integrated into the machine control 9.

The invention claimed is:

1. A method for determining a service life condition of a vibration damper, the method comprising:
   providing a vibration damper having a primary mass and a secondary mass, and having a working chamber which is arranged between the primary mass and the secondary mass and is filled with a viscous damping medium, wherein the vibration damper is arranged on a crankshaft of an engine in order to dampen or eliminate torsional vibrations of the crankshaft;
   S1) operating the engine;
   S2) determining at least one operating parameter of the engine, the at least one operating parameter comprising an operating time of the engine;
   S3) simulating a temperature distribution of the viscous damping medium in the working chamber based at least in part on the operating time of the engine; and
   S4) determining a lifetime condition of the vibration damper based on the at least one operating parameter of the engine and a result of the simulating of the temperature distribution of the viscous damping medium;
   wherein the simulation of the temperature distribution is carried out as a temperature field of the viscous damping medium for different operating states of the engine;
   wherein by way of simulation values of the temperature field of the viscous damping medium, an associated degradation rate of the damping medium is determined and compared with previously stored values of degradation rates of the damping medium as reference values; and
   wherein an output, an alarm, and/or a warning is given during the comparison when a previously definable limit value is exceeded.

2. The method according to claim 1, wherein
   steps S1) and S2) are repeated at predetermined intervals during operation of the engine, and
   the service life condition of the vibration damper is determined based on a plurality or all of the operating parameter determinations and temperature distribution simulations performed.

3. The method according to claim 1, wherein
   the at least one operating parameter is an operating time of the engine.

4. The method according to claim 1, wherein
   in step S3), a three-dimensional temperature distribution is determined as a temperature field of the viscous damping medium in the working chamber.

5. The method according to claim 1, wherein
   the primary mass comprises a ring-shaped housing with a ring-shaped working chamber, and the secondary mass is a flywheel ring arranged in the ring-shaped housing, a gap filled with the viscous damping medium is formed in the working chamber between the flywheel ring and the housing, a three-dimensional temperature distribution of the viscous damping medium in the gap in the working chamber being determined during step S3).

6. The method according to claim 1, wherein the previously stored values of degradation rates of the damping medium are stored as reference values for all operating states.

7. The method according to claim 6, wherein
   the previously stored values are in a look-up table.

8. The method according to claim 1, wherein an instantaneous degradation rate of the damping medium is determined by comparison with previously stored reference values.

9. The method according to claim 1, wherein a damage to the vibration damper is determined by integrating the determined degradation rates of the damping medium over time.

10. The method according to claim 1, wherein
    at least one calibration with a measurement of a further parameter is used for additional calibration of the simulation.

11. The method according to claim 10, wherein
    the further parameter is an outside temperature of the vibration damper at a previously determinable point.

12. The method according to claim 11, wherein
    an ambient temperature is used at points or also during operation of the engine and the vibration damper.

13. The method according to claim 1, wherein
    the vibration damper is a torsional vibration damper or an absorber.

14. An arrangement for determining a service life condition of a vibration damper, comprising:
    a vibration damper;
    an engine coupled to the vibration damper and having an engine control; and
    an evaluation device comprising a computer unit having a non-transitory computer readable medium comprising at least one program for:
    simulating temperature distributions of a viscous damping medium in a working chamber of the vibration damper based on at least one operating parameter of the engine, the at least one operating parameter comprising an operating time of the engine, and
    determining a lifetime condition of the vibration damper based on a result of the simulating of the temperature distribution of the viscous damping medium;
    wherein simulation of the temperature distribution is carried out as a temperature field of the viscous damping medium for different operating states of the engine;
    wherein by way of simulation values of the temperature field of the viscous damping medium, an associated degradation rate of the damping medium is determined and compared with previously stored values of degradation rates of the damping medium as reference values; and
    wherein an output, an alarm, and/or a warning is given during the comparison when a previously definable limit value is exceeded.

15. The arrangement according to claim 14, wherein
the vibration damper has a primary mass and a secondary mass, and has a working chamber which is arranged between the primary mass and the secondary mass and is filled with a viscous damping medium,
the vibration damper is arranged on a crankshaft of the engine in order to dampen or eliminate torsional vibrations of the crankshaft, the crankshaft forming part of the engine,
the computer unit being configured to:
  determine at least one operating parameter of the engine as the engine is operated;
  simulate a temperature distribution of the viscous damping medium in the working chamber; and
  determine a lifetime condition of the vibration damper based on the at least one operating parameter of the engine and a result of the simulating of the temperature distribution of the viscous damping medium.

* * * * *